Sept. 12, 1933.  A. W. DURR  1,926,197
PIPE COUPLING
Filed Sept. 14, 1932   2 Sheets-Sheet 1

INVENTOR
Arthur W. Durr
BY English and Studwell
ATTORNEYS

Sept. 12, 1933.  A. W. DURR  1,926,197
PIPE COUPLING
Filed Sept. 14, 1932  2 Sheets-Sheet 2

INVENTOR
Arthur W. Durr
English and Studwell
ATTORNEYS

Patented Sept. 12, 1933

1,926,197

UNITED STATES PATENT OFFICE 1,926,197

PIPE COUPLING

Arthur W. Durr, Akron, Ohio, assignor to American Hard Rubber Company, New York, N. Y., a corporation of New York Application September 14, 1932
Serial No. 633,055

5 Claims. (Cl. 285—193)

This invention relates to a coupling for pipes or conduits for conveying gases and liquids. The object of the invention is to provide a coupling so constructed that it receives and holds the pipes inserted in it without the use of the usual screw-threads employed in pipe couplings or connections. The improved coupling is particularly useful for connecting thin-walled pipes which because of the thinness of their walls cannot be easily screw-threaded for insertion into the conventional internally-threaded couplings. The coupling is also useful for connecting pipe lengths in places and under conditions where pipe-threading is either difficult or impossible.

The improved coupling constitutes convenient means for installing and repairing piping in mines and similar places where the necessary tools for cutting threads on the pipe ends and related parts are not ordinarily found and where the provisions and use of such tools are inconvenient and often impossible. For example, a line of piping through which liquid is pumped from the bottom of a mine to the surface will pass through several floors or levels. It is not convenient, nor desirable from the standpoint of operating expense, to maintain a repair kit including thread cutting tools at each level, and sometimes it is only possible to have one at the surface level or adit of the mine. Consequently, when a break occurs in the piping at some distance from the repair tools or in a situation where it is difficult to use thread cutting tools, much time is lost in inserting a new length of pipe. This difficulty is obviated by the improved pipe coupling of the present invention.

Specifically, the invention contemplates the provision of a coupling having internal, spiral or helical flexible teeth which are inclined toward the center of the coupling and which are flexed or compressed when the pipe ends are thrust into the coupling to grip firmly and strongly resist withdrawal of the pipes after they are once inserted in the coupling. The invention also contemplates the provision of means for preventing leakage between the coupling and the pipes inserted into it.

Figure 1:
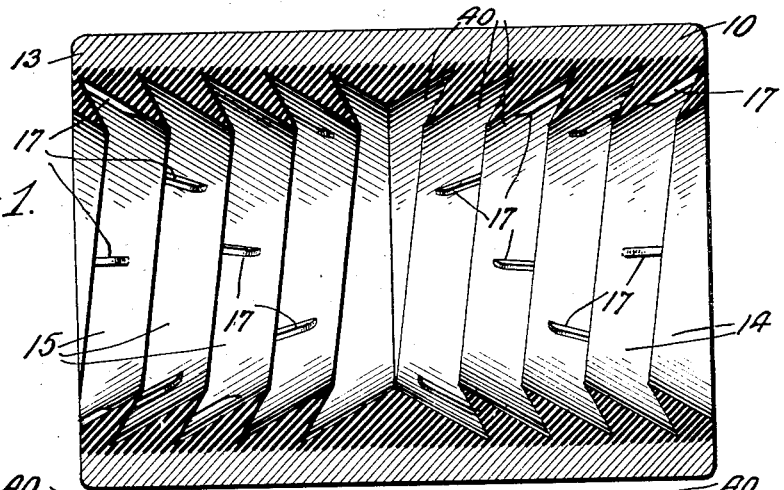
Figure 2:
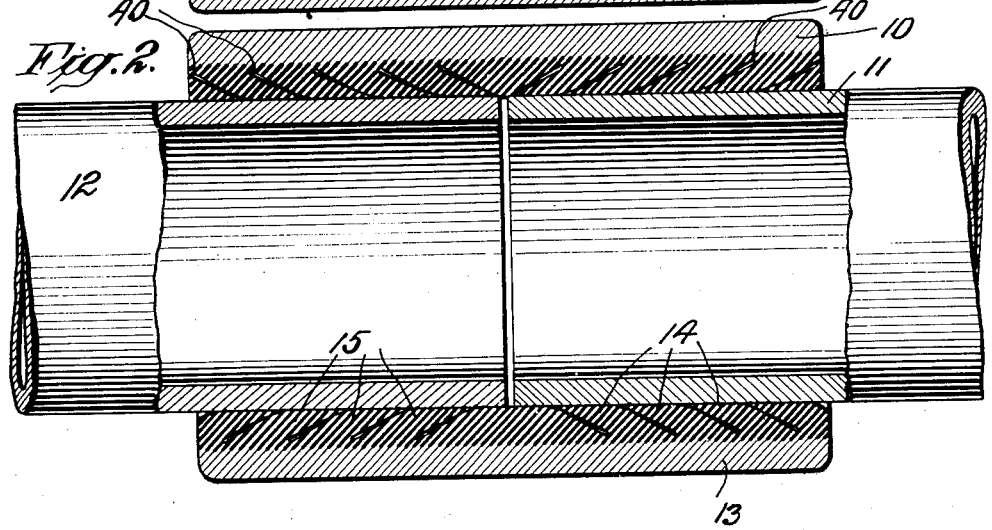
Figure 3:
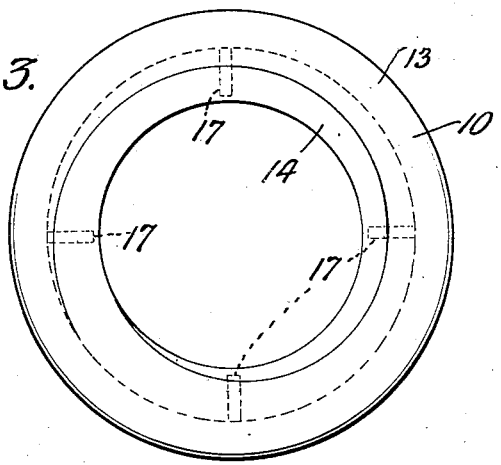
Figure 4:
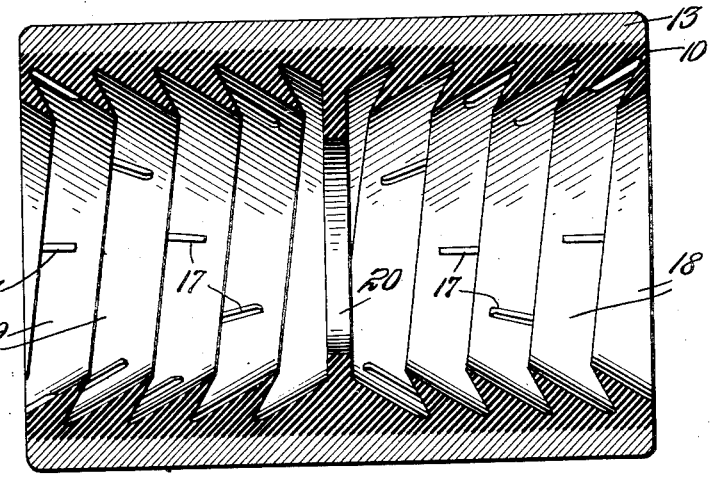
Figure 5:
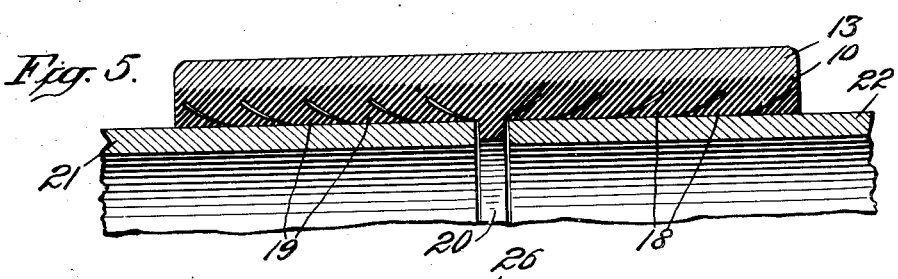
Figure 6:
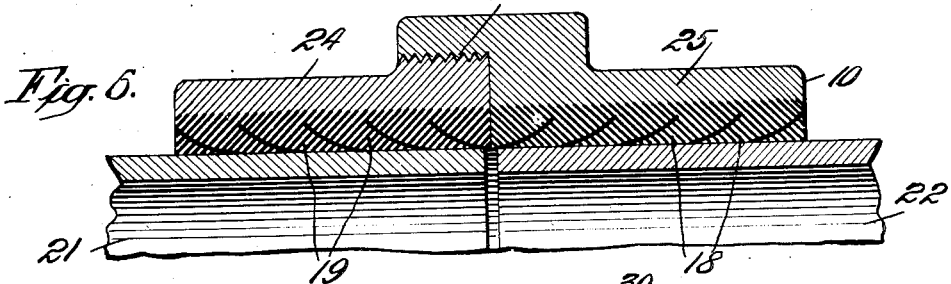
Figure 7:
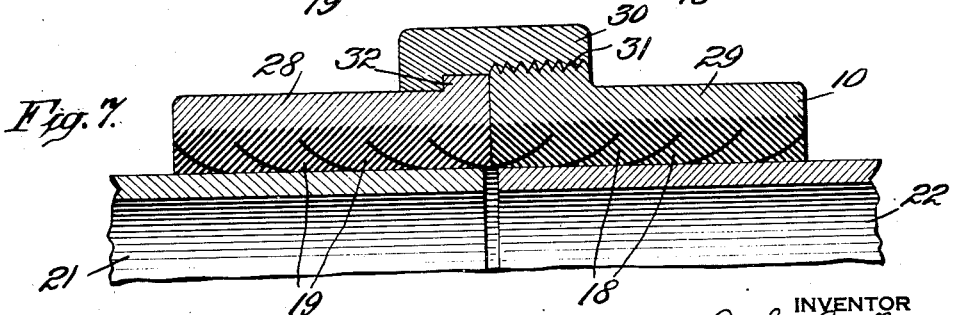

In the accompanying drawings Fig. 1 is a longitudinal sectional view of a coupling constructed in accordance with the invention; Fig. 2 is a similar view of the coupling, showing two pipe-ends inserted in it; Fig. 3 is an end view of the coupling; Fig. 4 is a longitudinal sectional view through a modified form of coupling; Fig. 5 is a view of the structure of Fig. 4, showing it connecting two pipes; and Figs. 6 and 7 are longitudinal sectional views through a portion of two modified structures.

The coupling shown in Figs. 1 to 3 inclusive consists of a cylindrical shell or sleeve 10 into which the ends of the pipes 11 and 12 are adapted to be inserted by pressure exerted axially of the pipes and which are firmly gripped by the coupling and prevented from being withdrawn. The coupling may be made of many suitable materials, the particular material selected being dependent upon the use to which the pipe line of which it forms a part is to be put. For example, when the pipe line is used for conveying acids or other liquids having a corrosive or deteriorating effect upon metals, pipes and couplings of a hardened plastic compound such as hard rubber or like acid-resistant materials may be used. The coupling if made of rubber, has its outer portion 13 composed of hard or relatively rigid rubber, the inner jaws or teeth 14 and 15 being formed integral with the hard outer portion, and composed of soft and flexible rubber. The teeth 14 are of wedge cross-section and are helical and incline toward the center of the coupling. When the coupling is formed on a core, the core may be easily withdrawn from within the coupling by unthreading it therefrom. The group of teeth 15 are similar to those shown at 14 except that they are oppositely disposed so that the pipe ends 11 and 12 when inserted into the opposite ends of the coupling will compress both groups of teeth in similar manner, as shown in Fig. 2.

In connecting two pipes, the pipes are inserted into the opposite ends of the coupling by pressure imposed axially of the pipes, a suitable tool being used for this purpose. Relatively little force is required to force the pipes into the coupling, since the teeth expand against each other when the two pipes are thrust inwardly or toward the center of the coupling. The high coefficient of friction between the material of the teeth 14 and 15 in the coupling and the surface of the pipes, resists any withdrawal movement of the pipes. This friction is greatly increased by the tendency of the flexible teeth to return to their normal position shown in Fig. 1 in which position the diameter of the teeth is less than that of the pipes. When the pipes are inserted in the coupling, the teeth 14 and 15 are so expanded that they substantially close the spaces 40 between them, thus forming a liquid-tight seal between the pipes and coupling. To prevent possibility of passage of liquid between the spiral or helical teeth of the coupling, ribs 17 extending transversely of the teeth are provided on the faces of the teeth, these ribs acting to block the passage or flow of liquid between the teeth.

The coupling as shown in the drawings consists of a straight tubular member, it being understood however, that it may be made in other forms, as for example, an elbow, T-shape or in any of the forms generally employed for pipe couplings.

In the modified structure shown in Fig. 4, the coupling consists of a tubular shell 10 having the hard or substantially rigid outer layer 13, as described in respect to the structure of Figs. 1 to 3. Formed integral with the outer layer are two groups of spiral or helical, inwardly inclined teeth 18 and 19, which are composed of soft flexible rubber or similar material. Located between the groups of teeth is an annular wall 20 which acts as a stop to limit the movement of the pipes when they are inserted into the coupling. In this embodiment of the invention the ribs 17, similar to those shown in Fig. 4, are also used.

In Fig. 5 pipes 21 and 22 are shown in position in the coupling with their ends separated by the annular wall 20. The spiral or helical teeth 18 and 19 are expanded and stretched around and resiliently bear against the surface of the pipes as shown in Fig. 5, and grip the pipes and prevent their withdrawal.

In Fig. 6 is shown another modified structure wherein the coupling is generally similar to that shown in Figs. 4 and 5 except that it is made in the two connected sections 24 and 25 which are joined together by screw threads 26. In this embodiment of the invention, the annular stop-wall 20 is omitted.

In Fig. 7 another modification is shown wherein the coupling consists of two sections 28 and 29 connected by a ring 30 which is internally screw-threaded at 31 to engage threads formed on the section 29. The ring operates against a shoulder 32 formed on the coupling section 28 to draw and hold the two elements 28 and 29 together. The construction of the coupling of Fig. 7 is otherwise similar to that shown in Fig. 6.

The softness and resiliency of the inclined gripping teeth employed in the various structures described enable the teeth to conform to any irregularities in the surface of the pipes held by the coupling, insuring a liquid-tight joint between the coupling and pipes under all conditions of use.

What I claim is:—

1. A coupling for pipes consisting of a tubular shell having an outer portion or layer of hard and relatively non-resilient material, and soft, resilient, helically-arranged teeth formed integrally with the hard outer portion, said teeth being wedge-shaped in cross-section and inwardly inclined to permit the entry of a pipe in the coupling and to resist its withdrawal from the coupling.

2. A coupling for pipes consisting of a tubular shell having a hard and relatively rigid outer portion, soft, resilient, helically-arranged teeth formed integral with the outer portion and located within the coupling, and spaced ribs extending transversely of the teeth to prevent passage of liquid between the teeth.

3. A coupling for pipes consisting of a tubular shell having an outer portion composed of hard rubber, soft rubber helical teeth located on the inside of the shell and formed integral with the hard portion thereof, said teeth being wedge-shaped in cross-section and inclined toward the center of the coupling, and one or more transverse ribs, located on the face of each of the teeth to prevent the passage of liquid between the teeth.

4. A coupling for pipes consisting of a tubular shell having an outer portion composed of hard rubber, soft rubber helical teeth located on the inside of the shell and formed integral with the hard portion thereof, an annular rubber stop-wall on the inside of the shell between the teeth, and one or more transverse ribs located on the face of each of the teeth to prevent the passage of liquid between the teeth.

5. A coupling for pipes consisting of a two-part shell, each of the parts of said shell having its inner face formed with inwardly inclined, soft rubber teeth, one of the parts being externally screw-threaded, the other part having a shoulder, and a ring member for engaging the screw-threads and the shoulder and holding the two parts together to form a continuous tubular member.

ARTHUR W. DURR.